US009396040B2

(12) United States Patent
Boldyrev et al.

(10) Patent No.: US 9,396,040 B2
(45) Date of Patent: Jul. 19, 2016

(54) METHOD AND APPARATUS FOR PROVIDING MULTI-LEVEL DISTRIBUTED COMPUTATIONS

(75) Inventors: Sergey Boldyrev, Söderkulla (FI); Jari-Jukka Harald Kaaja, Järvenpää (FI); Hannu Ensio Laine, Espoo (FI); Jukka Honkola, Espoo (FI); Vesa-Veikko Luukkala, Espoo (FI); Ian Justin Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 1146 days.

(21) Appl. No.: 12/979,144

(22) Filed: Dec. 27, 2010

(65) Prior Publication Data

US 2012/0166646 A1 Jun. 28, 2012

(51) Int. Cl.
*G06F 15/16* (2006.01)
*G06F 9/50* (2006.01)

(52) U.S. Cl.
CPC .................... *G06F 9/5088* (2013.01)

(58) Field of Classification Search
CPC .................................................... G06F 9/5083
USPC ......................................................... 709/226
See application file for complete search history.

(56) References Cited

U.S. PATENT DOCUMENTS

| 6,578,068 | B1 | 6/2003 | Bowman-Amuah | |
|---|---|---|---|---|
| 7,792,944 | B2 | 9/2010 | DeSantis et al. | |
| 8,266,192 | B2 * | 9/2012 | Nemoto et al. | 707/821 |
| 8,417,938 | B1 * | 4/2013 | Considine et al. | 713/151 |
| 8,490,087 | B2 * | 7/2013 | Beaty et al. | 718/1 |
| 8,495,611 | B2 * | 7/2013 | McCarthy et al. | 717/169 |
| 8,504,400 | B2 * | 8/2013 | Purcell et al. | 705/7.11 |
| 8,745,121 | B2 * | 6/2014 | Boldyrev | G06F 9/461 379/219 |
| 8,931,038 | B2 * | 1/2015 | Pulier | G06F 9/45558 709/226 |
| 9,069,599 | B2 * | 6/2015 | Martinez | G06F 9/455 |
| 9,201,701 | B2 * | 12/2015 | Boldyrev | G06F 9/5072 |
| 2002/0128001 | A1 | 9/2002 | Shuttleworth | |

(Continued)

FOREIGN PATENT DOCUMENTS

| GB | 2 454 497 A | 5/2009 |
|---|---|---|
| WO | WO 2010/030489 A2 | 3/2010 |

OTHER PUBLICATIONS

U.S. Appl. No. 12/825,043, filed Jun. 28, 2010, Sergey Boldyrev et al.

(Continued)

*Primary Examiner* — Douglas Blair
(74) *Attorney, Agent, or Firm* — Alston & Bird LLP

(57) ABSTRACT

An approach is provided for providing multi-level distributed computations. A distributed computation manager receives at least one request to migrate at least one computation closure within a computational architecture, the computational architecture comprising a plurality of architectural levels including, at least in part, a device level, an infrastructure level, and a cloud computing level. The distributed computation manager also determines to select at least one of the architectural levels based, at least in part, on a determination of whether the network infrastructure level can support the at least one computation closure. The distributed computation manager further determines to migrate the at least one computation closure to the selected at least one of the architectural levels.

22 Claims, 15 Drawing Sheets

(56) References Cited

U.S. PATENT DOCUMENTS

| | | | |
|---|---|---|---|
| 2008/0082546 | A1 | 4/2008 | Meijer et al. |
| 2009/0328034 | A1 | 12/2009 | Corcoran et al. |
| 2010/0115606 | A1 | 5/2010 | Samovskiy et al. |
| 2010/0332629 | A1 | 12/2010 | Cotugno et al. |
| 2011/0016214 | A1* | 1/2011 | Jackson ............... 709/226 |
| 2011/0238458 | A1* | 9/2011 | Purcell et al. ............ 705/7.27 |
| 2011/0270968 | A1 | 11/2011 | Salsburg et al. |
| 2012/0110185 | A1 | 5/2012 | Ganesan et al. |
| 2012/0110186 | A1* | 5/2012 | Kapur et al. ............ 709/226 |
| 2012/0130936 | A1 | 5/2012 | Brown et al. |
| 2012/0198253 | A1* | 8/2012 | Kato ............... G06F 1/20 713/320 |

OTHER PUBLICATIONS

U.S. Appl. No. 12/829,923, filed Jul. 2, 2010, Sergey Boldyrev et al.
U.S. Appl. No. 12/916,009, filed Oct. 29, 2010, Ian Justin Oliver et al.
U.S. Appl. No. 12/979,112, filed Dec. 27, 2010, Sergey Boldyrev.
U.S. Appl. No. 61/387,252, filed Sep. 28, 2010, Ian Justin Oliver et al.
A Survey of Load Balancing in Grid Computing, Li et al., in CIS 2004, LNCS 3314, Zhang et al. (eds.), Springer-Verlag Berlin Heidelberg, pp. 280-285.
User Modeling Servers—Requirements, Design, and Evaluation, von Josef Fink, Dissertation, Jul. 15, 2003, http://duepublico.uni-duisburg-essen.de/servlets/DerivateServlet/Derivate-11829, pp. 1-205.
International Search Report for related International Application No. PCT/FI2011/050988 dated Feb. 27, 2012, pp. 1-6.
International Written Opinion for related International Application No. PCT/FI2011/050988 dated Feb. 27, 2012, pp. 1-10.
Belkhouche, B. et al., "A RISC Virtual Machine for Internet Programming," UAE University, Jan. 31, 2011, pp. 1-40.
Office Action for related U.S. Appl. No. 12/979,112 dated Oct. 22, 2012, pp. 1-18.

* cited by examiner

METHOD AND APPARATUS FOR PROVIDING MULTI-LEVEL DISTRIBUTED COMPUTATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate webs of information with their own locally agreed semantics without necessarily conforming to an unobtainable, global whole.

Furthermore, in addition to information, the information spaces may be combined with webs of shared and interactive computations or computation spaces consisting of a multitude of devices so that each device, as parts of the computation spaces, can have the information in the information space manipulated within the computation space environment, which may include devices other than the device, and the results delivered to the device, rather than the whole process being performed locally in the device. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still in certain example implementations achieving scalable high context information processing within such heterogeneous environments is a challenging task. For example, in various implementations, due to distributed nature of the cloud, exchange of data, information, and computation elements (e.g., computation closures) among distributed devices involved in a cloud infrastructure may require excessive amount of resources (e.g. Process time, process power, storage space, etc.). However, different levels of proactive computational elements may be available to the device in various other components of various architectural levels, wherein different distributed components may have different capabilities and support different processes. In various example circumstances, to enhance the information processing power of a device and reduce the processing cost, one might consider minimizing or at least significantly improving exchange of data, information and computations among the distributed components.

SOME EXAMPLE EMBODIMENTS

In various example embodiments we can minimize or improve or significantly improve data migration within a computational architecture by providing multi-level distributed computations, such that the data can be migrated to the closest possible computation level with minimized or improved cost.

According to one embodiment, a method comprises receiving a request to migrate at least one computation closure within a computational architecture, the computational architecture comprising a plurality of architectural levels including, at least in part, a device level, an infrastructure level, and a cloud computing level. The method also comprises determining to select at least one of the architectural levels based, at least in part, on a determination of whether the network infrastructure level can support the at least one computation closure. The method further comprises determining to migrate the at least one computation closure to the selected at least one of the architectural levels.

According to another embodiment, an apparatus comprises at least one processor, and at least one memory including computer program code, the at least one memory and the computer program code configured to, with the at least one processor, cause, at least in part, the apparatus to process and/or facilitate a processing of at least one result of at least one request to migrate at least one computation closure within a computational architecture, the computational architecture comprising a plurality of architectural levels including, at least in part, a device level, an infrastructure level, and a cloud computing level. The at least one result is also based, at least in part, on at least one selection of at least one of the architectural levels based, at least in part, on a determination of whether the network infrastructure level can support the at least one computation closure. The at least one result is further based, at least in part, on at least one migration of the at least one computation closure to the selected at least one of the architectural levels.

According to another embodiment, a computer-readable storage medium carries one or more sequences of one or more instructions which, when executed by one or more processors, cause, at least in part, an apparatus to process and/or facilitate a processing of at least one result of at least one request to migrate at least one computation closure within a computational architecture, the computational architecture comprising a plurality of architectural levels including, at least in part, a device level, an infrastructure level, and a cloud computing level. The at least one result is also based, at least in part, on at least one selection of at least one of the architectural levels based, at least in part, on a determination of whether the network infrastructure level can support the at least one computation closure. The at least one result is further based, at least in part, on at least one migration of the at least one computation closure to the selected at least one of the architectural levels.

According to another embodiment, an apparatus comprises means for receiving at least one request to migrate at least one computation closure within a computational architecture, the computational architecture comprising a plurality of architectural levels including, at least in part, a device level, an infrastructure level, and a cloud computing level. The apparatus also comprises means for determining to select at least one of the architectural levels based, at least in part, on a determination of whether the network infrastructure level can support the at least one computation closure. The apparatus further comprises means for determining to migrate the at least one computation closure to the selected at least one of the architectural levels.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on: (a) data and/or information resulting from one or any combination of methods or processes disclosed in this application as relevant to any embodiment of the invention, and/or (b) at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-49.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing multi-level distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes associated with services, applications, device setups (e.g. provided by manufacturer), etc. and transmitting the computation slices between devices, infrastructures, clouds, information sources, etc.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
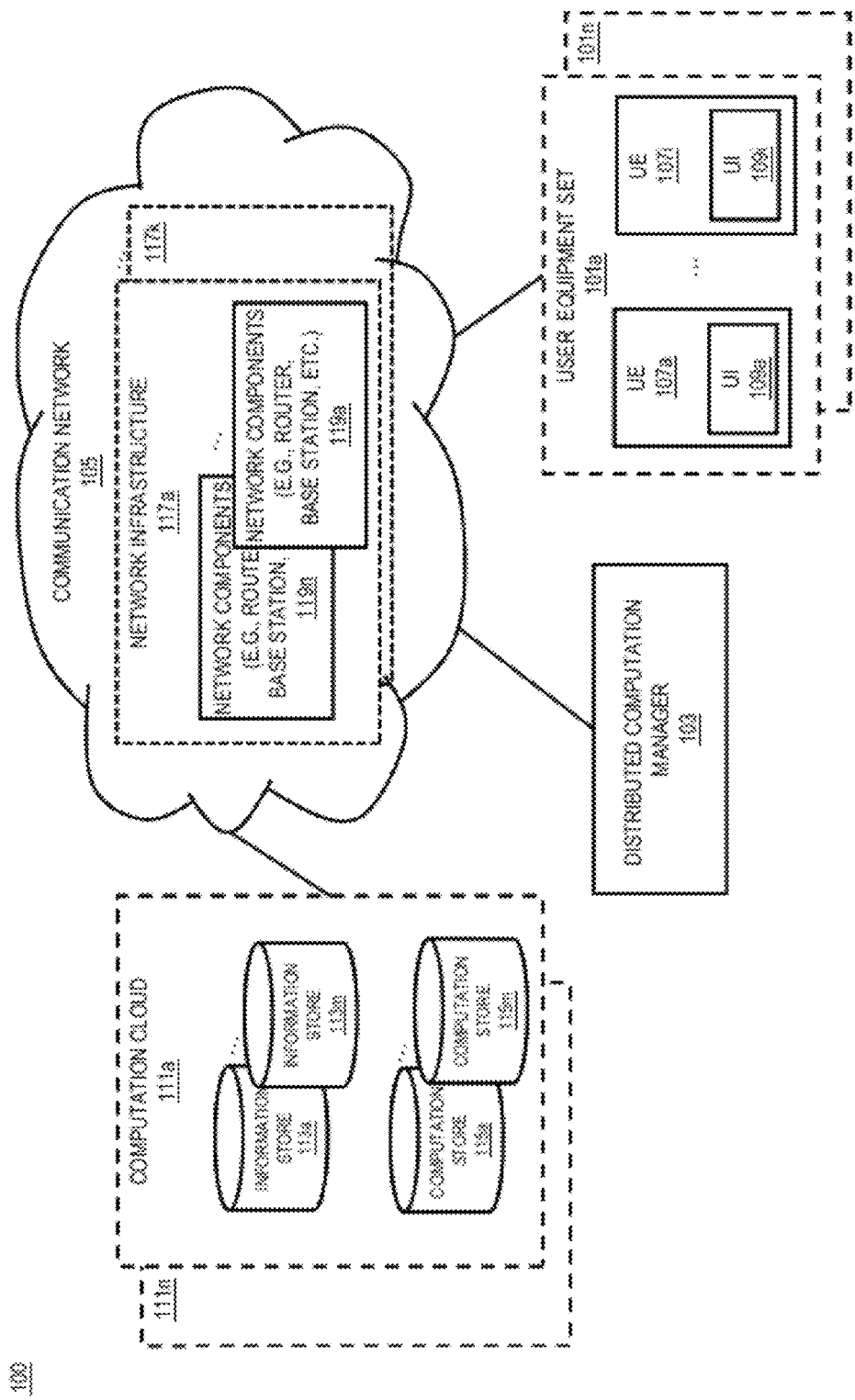
FIG. 1 is a diagram of a system capable of providing multi-level distributed computations, according to one embodiment.

FIG. 1 is a diagram of a system capable of providing multi-level distributed computations, according to one embodiment. As previously described, a cloud environment consists of information and computations resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment. Additionally, a device may have local wireless computational process performed within the device and other neighboring devices connected to wirelessly. In this case the process is conducted by an ad-hoc environment formed between the devices.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices. Current technologies enable a user of a mobile device to manipulate contexts such as data and information via the elements of a user interface of their user equipment. However, a user does not have control over the distribution of computations and processes related to or acting on the data and information within the cloud. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud, who connects to the cloud via one or more user devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via an infrastructure level, wherein the infrastructure level may consist of layers and components such as backbones, routers, base stations, etc. Typically, the computation closures associated with a process related to a device from device level are typically defined, constructed, and executed within the cloud computing level which may have various levels of distribution as well. However, the components of the infrastructure level may be equipped with various resources (e.g., processing environments, storage spaces, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Therefore, execution of computation closures associated with a process related to a device at the infrastructure level can provide services to device users in a more efficient manner.

In order to achieve this goal, a system 100 of FIG. 1 introduces the capability to provide multi-level distributed computations. A computational architecture environment consists of different levels of proactive computational elements available for various levels of the architecture such as device level, infrastructure level, and cloud computing level. Since these computational elements provide various levels of functionality for each of the levels, providing different levels of migration of the computational closures within the architecture enables the execution of the computational closures after the least required level of migration. This approach enables the device to utilize available processing power within the computational infrastructure by having certain functionalities migrated to the infrastructure level or further to the cloud level depending on the type of functionality needed by the device or offered by every level of the architecture.

In one embodiment, each level of the computational architecture may consist of multiple layers such that if one layer does not have access to proper resources for executing received migrated computation closures, the closures can be transfer to other layers within the same level of architecture before being migrated to the next level. Each layer of an architecture level may include multiple components. If all resources in the current layer of architectural level are exhausted, the closures may be migrated to other layers, other infrastructures, the next level of architecture, to the cloud, or to other clouds.

In one embodiment, if a component of an architecture level or a layer of the level lacks resources for executing received computations, the component may request to gain access to resources from other components in the same or different levels or layers. The computation closures may be migrated between infrastructure layers and levels, if components of the current layer or level cannot provide enough resources in response to the request.

As shown in FIG. 1, the system 100 comprises a set 101 of user equipment (UEs) 107a-107i having connectivity to distributed computation manager 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, including wireless personal area networks, ad-hoc networks, device to device networks, etc., or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, computation clouds, and other infrastructure.

In one embodiment, process migration can be initiated for example by means of unicast (e.g., to just another device), multicast (e.g., to multiple other devices), or broadcast (e.g., within limited area) to broadcast computation process migration initiation to get best results. This may be done by, for example, utilizing broadcast and select from one or all devices within that area. Additionally, process migration may be triggered via gesture recognition, wherein the user preselects a particular set of UI elements and makes a gesture to simulate "pouring" the selected UE elements from one device to another. In other embodiments, process migration may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation spaces 115a-115m include multiple sets of one or more computation closures.

In one embodiment, the communication network 105 consists of one or more infrastructures 117a-117k wherein each infrastructure is a designed communication system including multiple components 119a-119n. An infrastructure may be logical or physical, wherein a logical infrastructure (e.g. Virtual Private Network (VPN)) can be composed of multiple physical infrastructures. The components 119a-119n include backbones, routers, switches, wireless access points, access methods, protocols, etc. used for communication within the communication network 105 or between communication network 105 and other networks.

In one embodiment, the distributed computation manager 103 manages and monitors the distribution of computations associated with UEs 107a-107i to other levels of the architecture including the infrastructure level 117a-117k within the environment of the communication network 105, and the cloud level 111a-111n.

In another embodiment, network components 119a-119n may provide different levels of functionality. For example, some components 119a-119n may provide static computational closures while others may provide dynamic computational closures. As used herein, static computational closures are closures with predetermined configurations while dynamic computational closures are closures that may function differently based on dynamic factors such as time, traffic load, type of available power resource, etc. A dynamic computation closure may adjust itself based on the dynamic factor by modifying parameters such as the amount of reserved resources. Additionally, each architecture level (e.g. infrastructure) may support different types of closures or may have certain sets of pre-created entries for closures and relevant links.

In one embodiment the amount and type of available computational closures at a component of the infrastructure 117a-117k may or may not be aligned with the required computation closures by UE 107a-107i through a one to one mapping. This means that the component may need to locate (request) further computational elements from current or next layer or level of the architecture. In other words, if the computation closures between a process and its processing environment are not directly aligned, the processing environment may expand its computation closures (for dynamic closures) or request additional computational closures from other components (for static closures) or a combination thereof.

In one embodiment, the computational closures available in multiple levels of device level 101a-101n, infrastructure level 117a-117k, and cloud level 111a-111n are either aligned, meaning that all the computational closures are available in every level, or a super-set of all computational closures is available at cloud level while each lower level has access to a sub-set of the computational closures from its higher level, for example infrastructure level computational closures may be a sub-set of the closures of cloud level and device level closures a sub-set of the infrastructure level closures.

By way of example, the UE 107, and the distributed computation manager 103 communicate with each other and other components of the communication network 105 using well known, new or still developing protocols. In this context, a protocol includes a set of rules defining how the network nodes within the communication network 105 interact with each other based on information sent over the communication links. The protocol may also include rules for determining when to transfer computations to another architecture level, component, etc. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
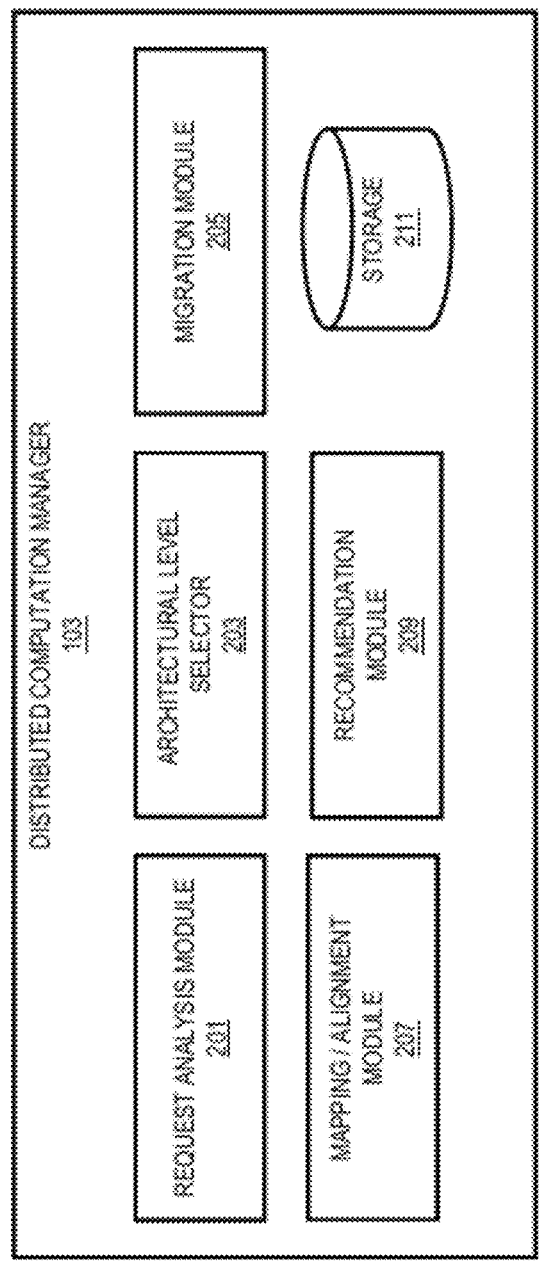
FIG. 2 is a diagram of the components of distributed computation manager, according to one embodiment.

FIG. 2 is a diagram of the components of distributed computation manager, according to one embodiment. By way of example, the distributed computation manager 103 includes one or more components for providing multi-level distributed computations. It is contemplated that the functions of these components may be combined in one or more components or performed by other components of equivalent functionality. In this embodiment, the distributed computation manager includes a request analysis module 201, an architectural level selector 203, a migration module 205, a mapping/alignment module 207, a recommendation module 209, and a storage 211.

Figure 3:
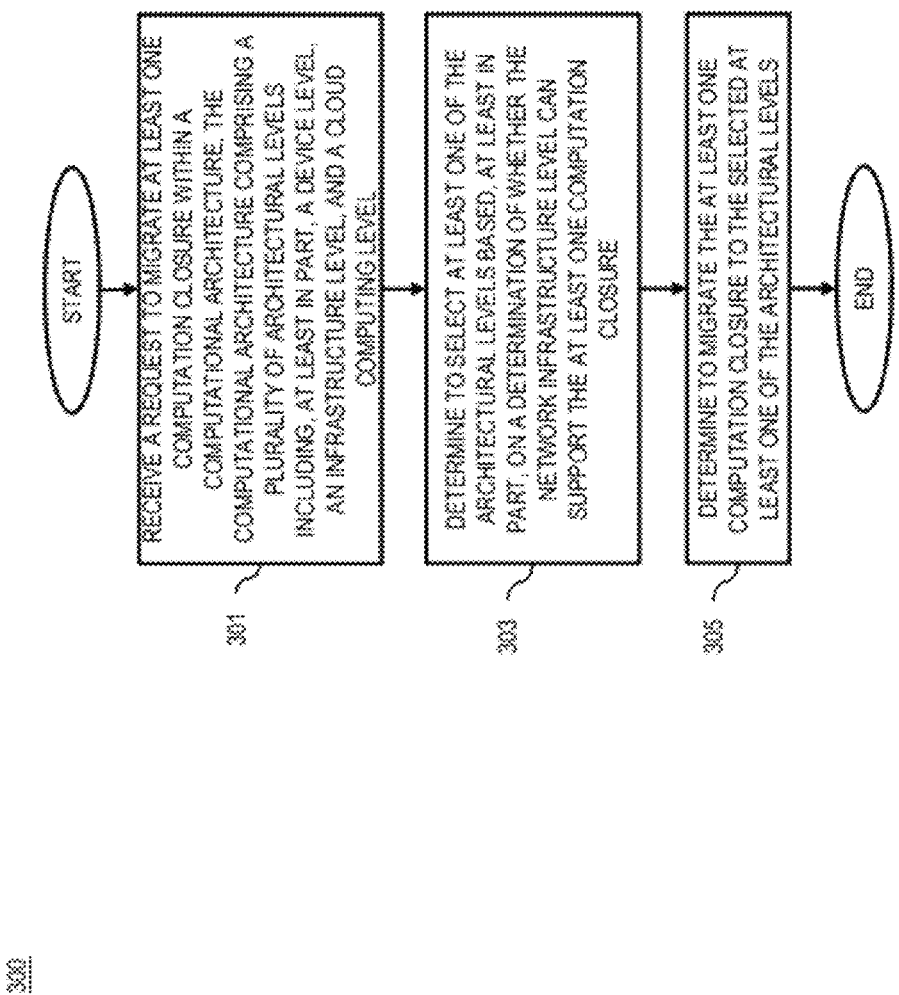
FIG. 3 is a flowchart of a process for providing multi-level distributed computations, according to one embodiment.

FIG. 2 is described with reference to FIG. 3, wherein FIG. 3 is a flowchart of a process for providing multi-level distributed computations, according to one embodiment. In one embodiment, the request analysis module 201 of the distributed computation manager 103 receives a request to migrate at least one computation closure within a computational architecture of system 100, wherein the architecture comprises a plurality of architectural levels including, at least in part, a device level 101a-101n, an infrastructure level 117a-117k, and a cloud computing level 111a-111n (per step 301 of FIG. 3).

The request analysis module 201 may also analyze the received computation closures regarding the level of support and resources needed for the execution of the computation closures. The request analysis module 201 may also evaluate the level of support needed for the request against the level of support available at every level of the architecture. The request analysis module 201 may store the analysis results in storage 211.

In one embodiment, the architectural level selector 203 determining to select at least one of the architectural levels based, at least in part, on a determination of whether the network infrastructure level 117a-117k can support the at least one computation closure (as seen in step 303 of FIG. 3).

The architectural level selector 203 may use the analysis results stored in storage 211 by the request analysis module 201. Typically, the computation closures may be migrated to the computation cloud 111a-111n, however, in one embodiment; the architectural level selector 203 may select an available component in the infrastructure level 117a-117k for migrating the closures, and select a component in the computation cloud level 111a-111n only if no support is available at the infrastructure level.

In another embodiment, the architectural level selector 203 may use previously calculated information at an architectural level or the components of the architectural levels for selecting the level or one or more components of the level for closure migration. For example, an architectural level may have previously calculated results from various input alternatives (e.g., static computational closures) wherein input alternatives are known and computational results are calculated and stored in advance. In this embodiment, the output results can be selected from pre-created entry alternatives. It is noted that some components provide more static computational closures, while other components may vary more, for example, based on time, traffic load, power resources, etc. In one embodiment, the distributed computation manager 103 may reserve a larger (or a smaller) portion of the static (or dynamic) computational closures in components of the architectural levels.

In one embodiment, the architectural level selector 203 may use cost calculation methods, or any other selection parameters, for selecting a suitable level for computation migration. For example, factors such as relative cost of power consumption for battery usage versus main supply usage, or cost of changes in devices, network, etc. and their effect on computation closure alignment among devices can be calculated. Additionally, priority levels may be assigned to selection methods, and preferred sets of selection methods can be used based on their priority levels. For example, sets of most used selection methods or sets of most recommended selection methods for each specific computation type may receive highest priority levels, wherein the recommendation can be, for example, determined based on certain parameters defined by user, application, service provider, etc. The architectural level selector 203 may use the calculated cost or other parameters to compare and find the difference between available capabilities at an architectural level and the capabilities required by the migrating computation closures.

In one embodiment, the migration module 205 determining to migrate the at least one computation closure to the at least one of the architectural levels selected by the architectural level selector module 203 (as per step 305 of FIG. 3). It is noted that migration of closures from UEs 107a-107i of the device level 101a-101n to the infrastructure level 117a-117k is a less costly process than the migration of closures from device level 101a-101n to the cloud level 111a-111n. This is because any communication between the device level 101a-101n and cloud level 111a-111n has to be through the infrastructure level 117a-117k. In other words, the infrastructure level 117a-117k is halfway between the device level 101a-101n and the cloud level 111a-111n.

It is noted that computation closures are primitive building blocks of processes and various computation closures may have common or similar elements. If one or more computation closures are supposed to be migrated from a level of the architecture to another level of the architecture to be executed, and other computation closures with the same functionalities as the migrating computation closures are found in the destination level, the migrating closures will not have to be migrated because they can be substituted by the similar closures found and the similar closure found can be executed instead of the migrating closures at the destination level.

In one embodiment, the mapping/alignment module 207 determines to map, to verify, and/or to validate one or more elements, one or more functions, or a combination thereof associated with the at least one computation closure against one or more other elements, one or more other functions, or a combination thereof of one or more other computation closures associated with any one or more of the architectural levels 101, 117, or 111. In one embodiment, the architectural level selector 203 may use the results from the mapping, verification and validation of computation closures by the mapping/alignment module 207 for determining to select the at least one architectural level. For example, if elements of the migrating computation closures are mapped into the elements of computation closures associated with more than one components of an architectural level, the architectural level selector 203 may select the component with higher number of mapped elements which requires less closure migration for the execution. In other embodiments, the architectural level selector 203 may select the components with higher processing power for more complex mapped elements, etc.

In another embodiment, the mapping/alignment module 207 may determine one or more predetermined configurations for distributing the at least one computation closure. For example, a predetermined configuration may state that computation closure with certain characteristics or certain complexity levels must be executed at certain pre-assigned components of certain architectural levels. A predetermined configuration may also include logical conditions that the selection of the architectural level should be based on. In one embodiment, the architectural level selector 203 selects the at least one of the architectural levels based, at least in part, on the one or more predetermined configurations.

In one embodiment, the predetermined configuration may override the map, verify, and/or validate results from the mapping/alignment module 207. In other embodiments the results may override the predetermined configuration. Yet, in other embodiments, a combined selection approach may be used based on the results and the configuration.

In one embodiment, the mapping/alignment module 207 determines an alignment of the at least one computation closures among one or more of the architectural levels. It is noted that a one to one alignment between the computation closures associated with the process and the computation closures associated with an architectural level may not be found. It means that the architectural level selector 203 may need to locate further components from current or next architectural levels for process migration. For example, the computation closures associated with the process may be partly aligned with computational closures of one or more components of the infrastructure level 117a-117k and partly aligned with computational closures of one or more components of the cloud computing level 111a-111n, wherein the total process is covered with the alignments. In this case the architectural level selector 203 may determine to select the at least one of the architectural levels based, at least in part, on the alignment. In one embodiment, if even multi-level alignment does not cover the process completely, the migration module 205 may exchange computation closures between levels, wherein the closure exchange may be modular, system specific, general, or a combination thereof. It is noted that if the cloud level is involved in the alignment, all the needed computation closures may be available via the cloud, however, migration of computation closures from, for example, device level to infrastructure level may be more cost effective than the migration of the closures from the cloud level to infrastructure level.

In one embodiment, following the selection of at least one architectural level by the architectural level selector 203, the recommendation module 209 determines resource availability information associated with the selected architectural levels. The recommendation module 209 may use components configuration data, manufacturer data, system logs or a combination thereof for determining the available resources. In this embodiment, the recommendation module 209 may provide at least one recommendation, at least one instruction, or a combination thereof for increasing resource availability at the selected at least one of the architectural levels. For example, the recommendation module may instruct one or more current execution at the selected level to be temporarily or permanently terminated, so that the resources utilized for the current process can be assigned to the migrating process. The recommendation module 209 may select the terminating processes based on the process priorities. The priorities may be part of a predetermined configuration, determined by the user, determined by a component of the architectural level, or a combination thereof. The recommendation module may also recommend resources from other components or other levels to be borrowed for the execution of the migrating process. The recommendation module 209 may store the recommendations or instructions in storage 211 to be used by the migration module 205 for process migration.

It is noted that, subsequent to the selection of one or more architectural levels by the architectural level selector 203, one or more changes may occur in the selected at least one of the architectural levels. For example, the resources may become unavailable, the components may be invalidated, new security, privacy or other protocols may be applied, etc. In one embodiment, the migration module 205 determines one or more changes at the selected at least one of the architectural levels and determines to reject, to delay, to withdraw, and/or to redistribute the migration of the at least one computation closure based, at least in part, on the one or more changes. The determination of what action to take when change occurs may be based on the status and type of the change (e.g. temporary, permanent, intentional, accidental, etc.), the priority or importance level of the migrating process (e.g., system process, application process, user defined process, etc.) or a combination thereof. Furthermore, the action may be taken immediately after a change is diagnosed or after a certain threshold.

Figure 13:
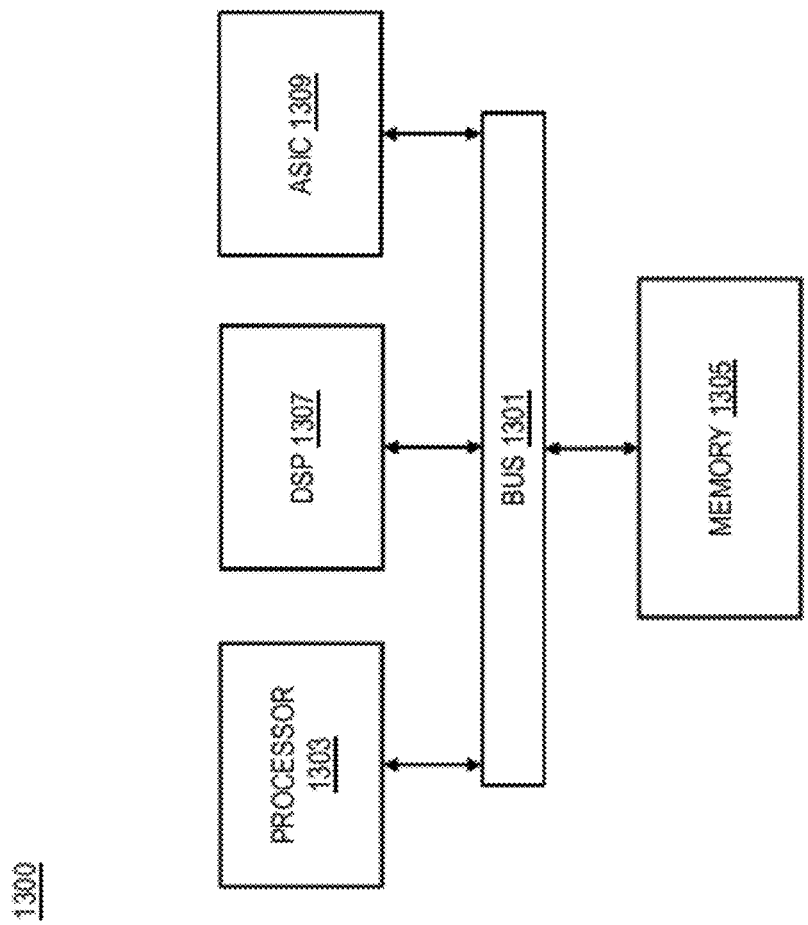
FIG. 13 is a diagram of a chip set that can be used to implement an embodiment of the invention.

In one embodiment, the distributed computation manager 103 performs the process 300 of FIG. 3 and is implemented in, for instance, a chip set including a processor and a memory as shown in FIG. 13.

Figure 4:
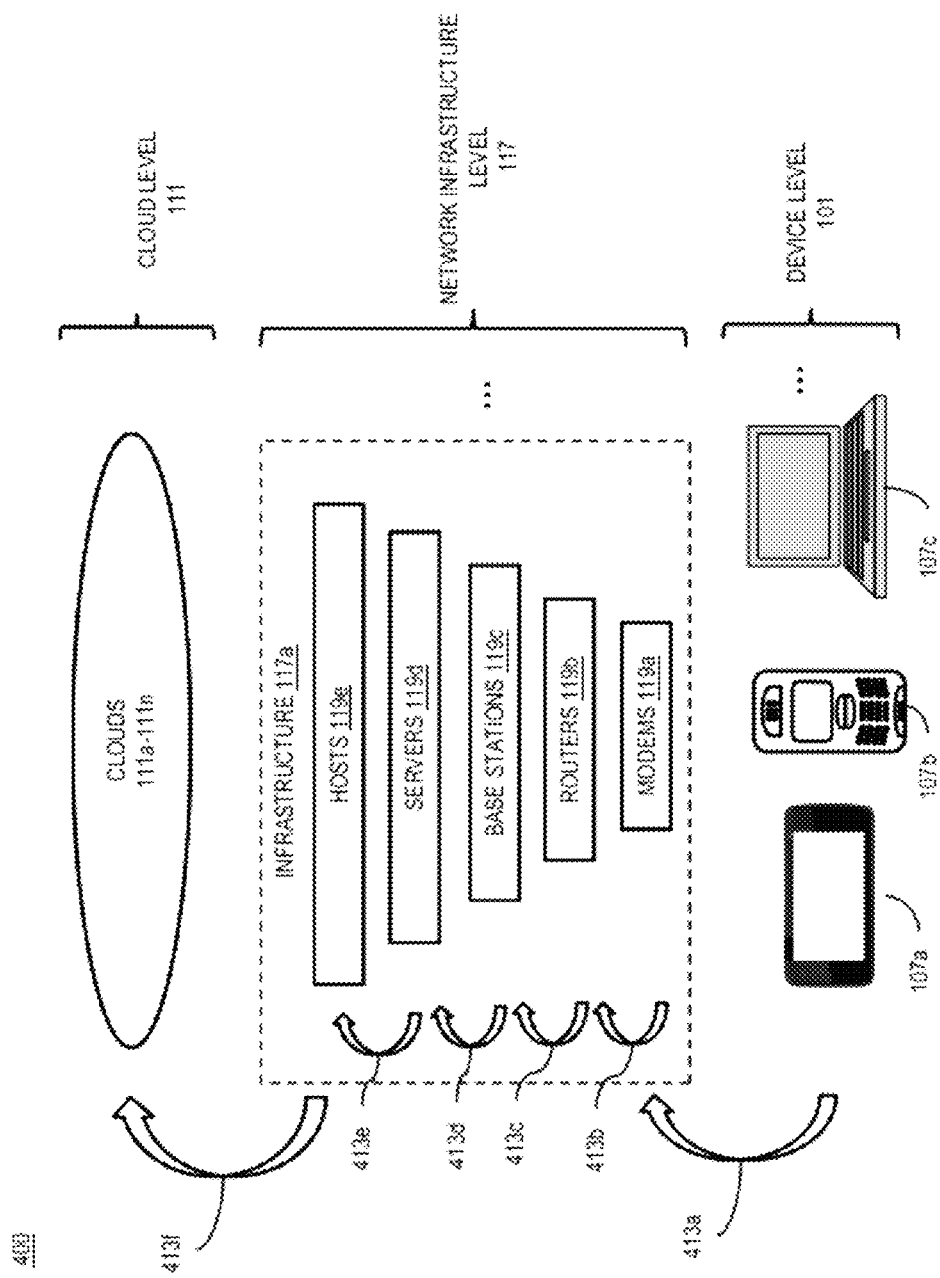
FIG. 4 is a diagram of a distributed computation architecture, according to one embodiment.

FIG. 4 is a diagram of distributed computation architecture, according to one embodiment. FIG. 4 represents a distributed computation architecture 400 that consists of three main architectural levels cloud level 111, network infrastructure level 117 and device level 101. As seen in FIG. 4 the device level 101 consists of one or more UEs such as 107a, 107b, 107c, etc. The infrastructure level 117 consists of one or more infrastructures (only one infrastructure 117a shown), wherein each infrastructure consists of a plurality of components such as modems 119a, routers 119b, base stations 119c, servers 119d, hosts 119e, etc. Furthermore, cloud level 111 may consist of one or more clouds 111a-111n. It is noted that the communication among the components of these architectural levels can be one to many, many to one, or many to many. This means that for example, one or more UEs 107 may have connectivity for one or more infrastructures 117a and one or more infrastructures 117a may be connected to one or more clouds 111a-111n.

In various embodiments a UE 107 of device level 101 is able to forward, at least partially, its computation closures to infrastructure 117a from the infrastructure level 117 in order to do proactive computing by assigning functionalities associated to the computation closures to the infrastructure 117. It is noted that an infrastructure 117a consists of one or more components wherein each component may be equipped with resources that can be utilized for execution of computation closures. For example, a router 119b or a base station 119c may have available storage, processing power, information and computation stores suitable for the execution of migrated processes.

In other embodiments, a UE 107 may prioritize computational forwarding to cloud against forwarding to an infrastructure, based on various parameters related to security, privacy, local and/or global recommendations, cost, etc. The UE 107 may also prefer an infrastructure for migration of certain computations and lock those computations in that specific level so that the computations are always executed in that architectural level until the preference is modified or removed.

In FIG. 4, arrows 413a-413f represent the direction and steps of process migration from device level 101 to cloud level 111. In one exemplary embodiment, following the receiving and analysis of a request for migration of one or more computation closures by the distributed computation manager 103 (as seen in step 301 of FIG. 3), the architectural level selector 203 from the distributed computation manager 103 may investigate existence of support for the migration starting from the lowest layer of the infrastructure 117 (e.g. modems 119a). At every layer if support capability is found at the layer or by the combined resources of the current layer and the layers below the current layer, the investigation may end and the migration of computation closures may start, otherwise, other layers of the architectural level is searched for support. For example if the architectural level selector 203 determines that the resources available at the base station 119c or combined resources from the base station 119c, router 119b and modem 119a can support the at least one computation closures that are being migrated, the supporting layers can be selected and the migration module 205 can start the migration process. In this example there will be no need for the architectural level selector 203 to investigate neither the support capability of layers 119d and 119d from the infrastructure level 117, nor the support capability of the cloud level 111. Additionally, in this example, any communication between the device level and selected architectural levels (migration, transfer of execution results, etc.) will be performed in three steps as seen by arrows 413a-413c, compared to the typical approach, wherein the migration destination is always the cloud level and the infrastructure level is used as interfaces only meaning that the migration math will include the complete path 413a-413f. It is noted that the approach described, can benefit from the resources available at the infrastructure level 117 and eliminate extra steps of migration to the cloud level 111 which may save resources and increase the throughput of the whole system 100.

In one embodiment, at every step of the migration process, the distributed computation manager 103 announces, within the current architecture, the current status of computation closures such as, the device selected to be in charge of the computation, whether the closures are being sent to the next level of the architecture, etc. For example, during the investigation process by the architectural level selector 203 for finding a suitable component, it may be concluded that changes in the initial UE 107a or in device level in general may have enabled the UE 107a or another UE to execute the process and there is no need for migration. In this case the component 119a is just used as a bridge point for directing computation requirements back to the device level. For example, a UE with a low battery power may have been plugged to the power supply and therefore able to execute the process it initially requested to be migrated.

In other embodiments, any change in the component selected by architectural level selector 203 for executing the computation, may cause the computations to be redistributed to other components within the same or other architectural levels.

Figure 5:
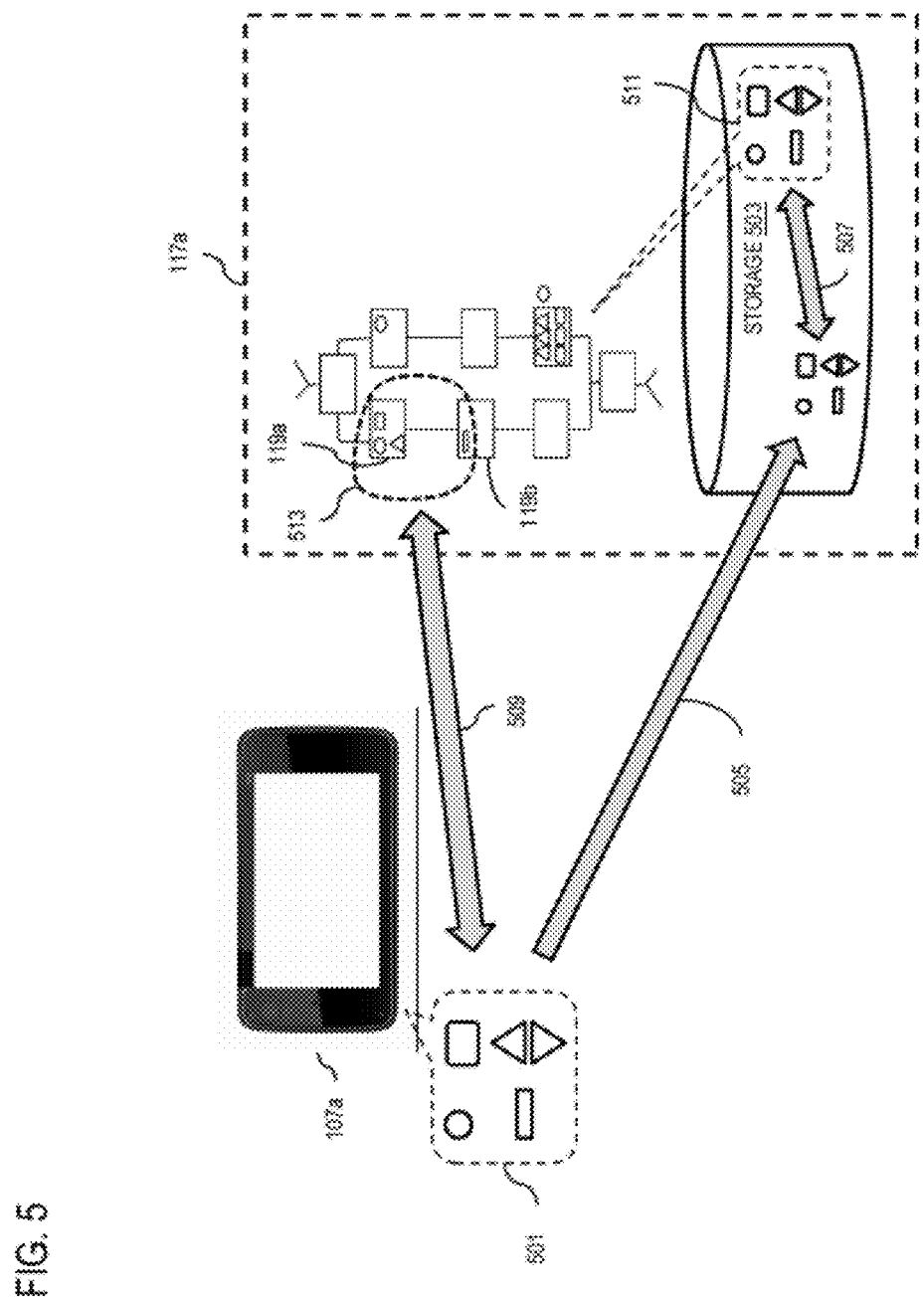
FIG. 5 is a diagram of computation closure support architecture characteristics, according to one embodiment.

FIG. 5 is a diagram of computation closure support architecture characteristics, according to one embodiment. In one embodiment, the distributed computation manager 103 receives a request to migrate a set of computation closures. The distributed computation manager 103 stores the computing closures information to an executable context 501 that is shared to infrastructure 117a in order for the architectural level selector 203 to prepare computing closure functionality verifications for determining whether infrastructure 117a consists of enough functionality to support computing closures. Subsequently, the computation closure information 501 is stored by the distributed computation manager 103 in storage 503 of infrastructure 117a (shown by arrow 505). The information may be kept at storage 503 temporarily until the migration process is completed.

In one embodiment, the architectural level selector 203 enumerates and collects all available computation closures in the components of the infrastructure 117a into a set 511 and store the set 511 in the infrastructure storage 503. In one embodiment, the infrastructure map of available computation closures 511 may be stored at the infrastructure dispatcher (centrally stored). In other embodiments the architectural level selector 203 may compare the migration request from UE 107a individually with the functionalities with each component of the infrastructure 117a to determine whether enough computation closures functionalities are supported (distributed determination). The comparison among the computation closures and the available functionalities is depicted by arrow 507. In the embodiment of FIG. 5, the functionalities that support computation closures of set 501 are found in components 119a and 119b of infrastructure 117a shown as set 513. Therefore, the architectural level selector 203 may select components 119a and 119b and the migration module 205 may migrate the process of closures 501 to the infrastructure 117a shown by arrow 509.

In one embodiment, the distributed computation manager 103 provides the option for the architectural level to reject or delay and for the UE to delay or withdraw the computation closures migration activity, if there are changes in configurations or the state of the selected components or the requesting UEs. For example, changes such as power shortage, malfunctioning, or congestion at target component may trigger the rejection or delay of the migration. In this case, the computation closures may be forced forwarded by the migration module 205 to another component (e.g. a component with similar computational closure capabilities) selected by the architectural level selector 203. The forcing of the closures to another component may be done either immediately or after a certain threshold is crossed over.

In one embodiment, the architectural level selector 203 may determine and collect computational closures capabilities of various components of the infrastructure and store the determined information is storage 211 for further use. For example the architectural level selector 203 may collect the capability information at its first encounter with an infrastructure, during each computational closure activity period, etc.

and create, update and store a computational closure capability map for each architectural level at the storage 211.

Figure 6:
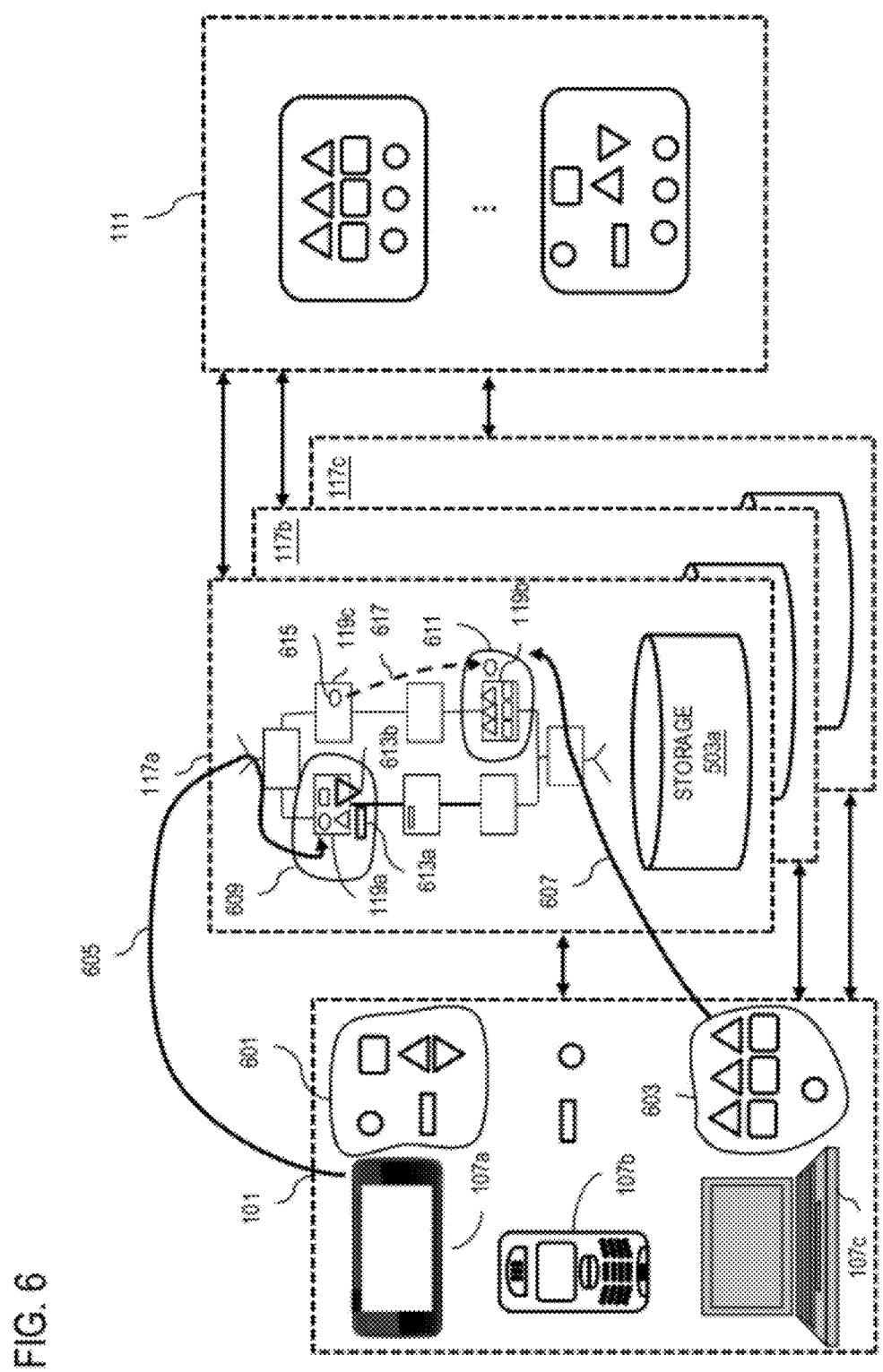
FIG. 6 is a diagram of multi-level computation closure support architecture, according to one embodiment.

FIG. 6 is a diagram of multi-level computation closure support architecture, according to one embodiment. In one embodiment, the set 101 comprises UEs 107a, 107b, and 107c, wherein UE 107a needs sets 601 and UE 107c needs set 603 of computation closures to be migrated and executed by the next level of architecture, infrastructure 117a. The distributed computation manager 103 receives a request from UE 107a for migration of set 601. The architectural level selector 203 selects component 119a from infrastructure 117a as a match for migration. Component 119a includes three of the five closures from set 601, the migration module 205 migrates the two missing closures 613a and 613b from UE 107a to component 119a as shown by arrow 605. The resulting set 609 is a map of set 601 that can be executed at component 119a and the results sent back to UE 107a. In the case of UE 107c and set 603 of computation closures, the architectural level selector 203 may select component 119b for migrating process 603. In this example, the missing computation closure may be migrated from UE 107c to component 119b to generate the set 611 as indicated by the arrow 607. In another embodiment, the recommendation module 209 may recommend or instruct component 119b to use closure 615 from component 119c as the missing closure as shown by dotted arrow 617.

In one embodiment, UEs from set 101 are informed about capabilities found in infrastructure components via a base station or other components of the infrastructure. The base station may periodically exchange updated information about available capabilities with the UEs, or send the updated information to each UE upon request.

In one embodiment, the distributed computation manager 103 sets a computational granularity level among UEs 107a-107n and the components of infrastructure 1117a-117k. The granularity level may be set individually or for a set of UEs and a set of components at a time. This setting provides initial information for the architectural level selector 203 for narrowing or expanding the selection options for process migration.

As previously discussed, the capabilities of either point of the migration (e.g. UE 107a or component 119a) may change. For example, a component 119a may lose its power supply, the UE 107a may be plugged to main power supply instead of being operated by a battery, etc. In such cases, the migration module 205 determines the change and adjusts the migration accordingly by, for example, withdrawing, delaying, redistributing closures to other components, etc.

Figure 7:
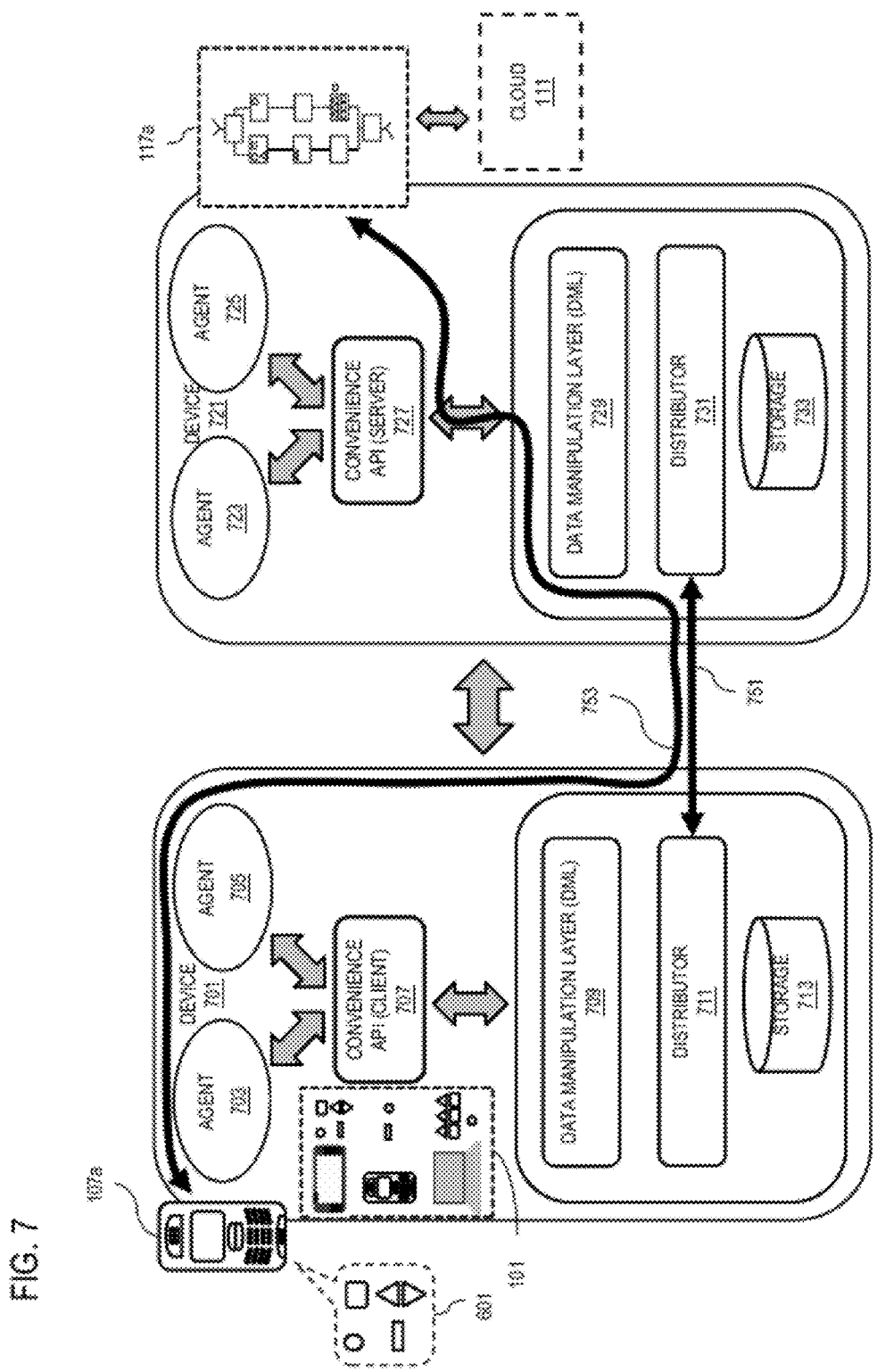
FIG. 7 is a diagram of computation migration in multi-level architectures, according to one embodiment.

FIG. 7 is a diagram of the internal structure of the devices involved in computation migration in multi-level architectures, according to one embodiment. FIG. 7 shows computation closure migration between devices 701 and 721. Each of the devices 701 or 721 may be a device in a communication architecture from each of the architectural levels device level, infrastructure level or cloud level. A device may include one or more agents such as agents 703 and 705 in device 701 and agents 723 and 725 in device 721. The agents within a device may act as interfaces between the device and other devices. Furthermore, the agents (e.g., agents 703 and 705, and agents 723 and 725) interact with the data manipulation layers 709 and 729 control the manipulation (insert, delete, update, etc.) of the data associated with the device (e.g. computation closures) via the convenience application programming interfaces (APIs) 707 and 727 respectively. The data may be locally stored in storage 713 or 733 or distributed in one or more clouds 111 accessible by the device. Distributors 711 and 731 handle data exchange between devices 701 and 721 shown by arrow 751. In the exemplary representation of FIG. 7, device 701 is a UE 107a while device 721 is a component of an infrastructure level 117a and is associated with a cloud 111 via infrastructure 117a.

In one embodiment, the distributor 711 may initiate a request for computation migration to device 721. The request may be in the form of a query, a signal, a message or any combination thereof. The request is received and processed by the request analysis module 201 of the distributed computation manager 103. The architectural level selector 203 selects the level 117a for migration as previously discussed in FIGS. 2, 3, and 4.

In one embodiment, following the selection of the architectural level, the migration module 203 starts process migration from device 701 to component 721 of infrastructure 117a as shown by arrow 753. As seen, the migration is performed by distributor 711. Subsequently, the migrated closures are received at device 721 by distributor 731. The migration module 205 may verify whether any changes has occurred in any of the devices 701 or 721 and determine to reject, delay, withdraw or redistribute computation closures. If no changes occurred, the distributor 731 facilitates further process of the received computation closures. The closures may be stored in a storage 733, processed by the data manipulation layer 729, etc.

Figure 8A:
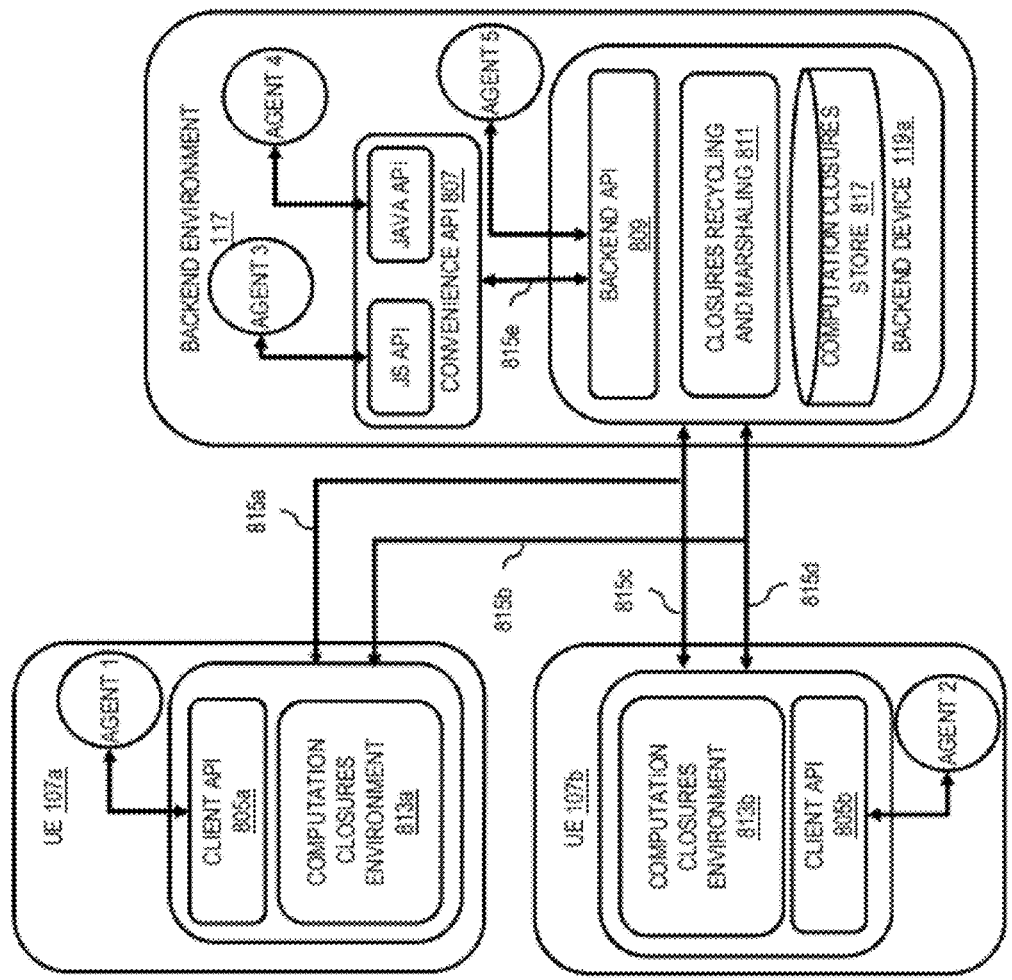
FIGS. 8A-8B are diagrams of computation migration among devices, according to one embodiment.
Figure 8B:
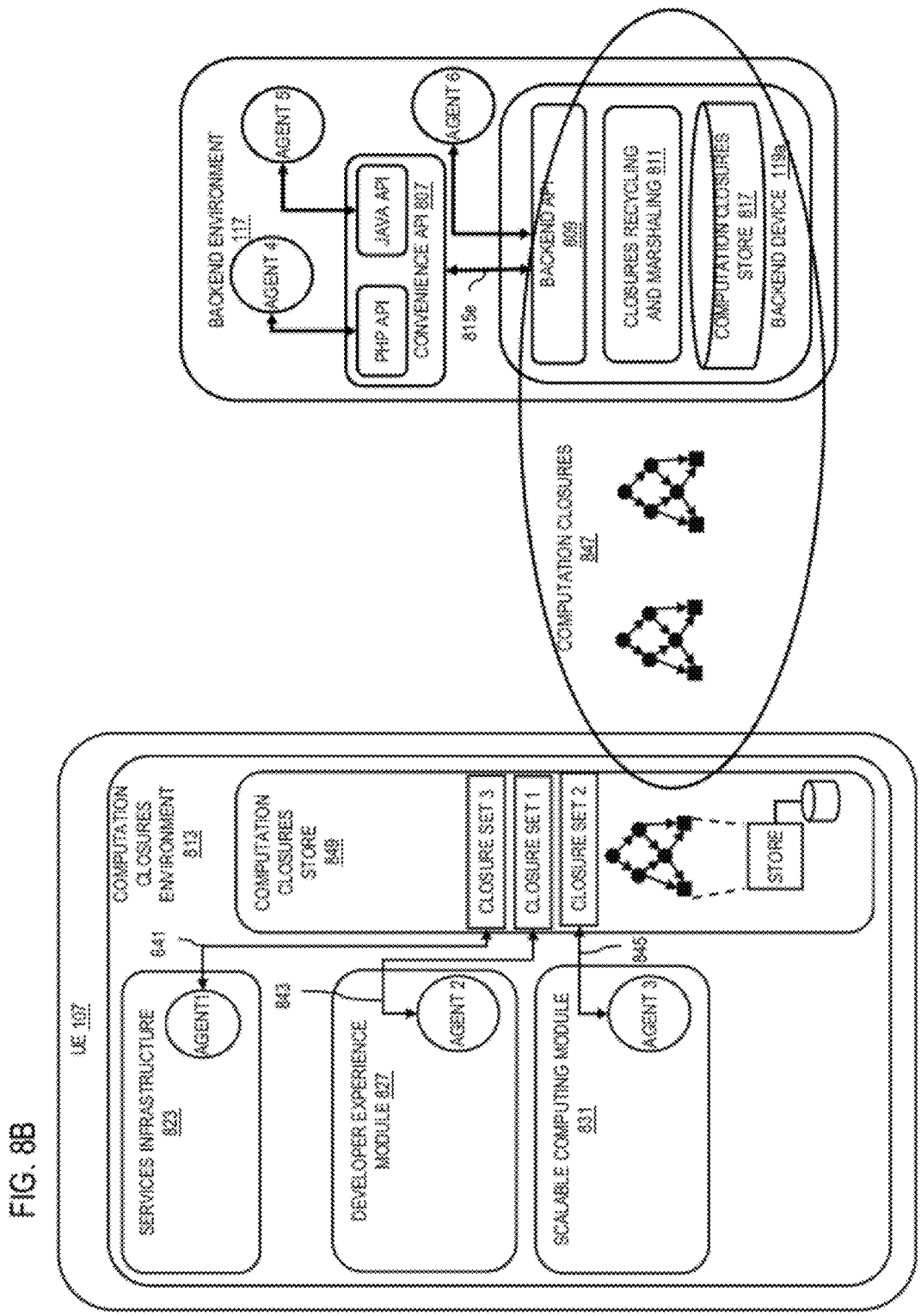

FIGS. 8A-8B are diagrams of computation migration among devices, according to one embodiment. In one embodiment, in FIG. 8A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 807 that may include APIs tailored to the software development environments used (e.g. JAVA, PHP, etc.). Furthermore, UEs 107a and 107b may include client APIs 805a and 805b. Each API enables interaction between devices and components within another device or an environment. For example, backend API 809 enables interaction between the backend device 119a and Agent5, and convenience API 807 enables interaction between the backend device 119a and agents Agent3 and Agent4, wherein each agent is a set of processes that handle computation closures within the backend environment 117. APIs 805a and 805b enable interaction between UE 107a and agent Agent1, and UE 107b and agent Agent2 respectively. As seen in the example of FIG. 8A, Agent3 works under PHP while Agent4 is a JAVA process. Each of the UEs 107a and 107b has a computation closure environment 813a and 813b which may be part of a cloud 111. Arrows 815a-815e represent migration path of computation closures among the environments 813a, 813b and the computation closure store 817. The computation closures store 817 is a repository of computation closures that can be accessed and used by all the UEs and infrastructure components having connectivity to the backend environment 117.

In one embodiment, the backend device 119a may be equipped with a closure recycling and marshaling component 811 that monitors and manages any access to the computation closure store 817. In other embodiments the closure recycling and marshaling (i.e. standardization for uniform use) may be a function of the distributed computation manager 103.

In one embodiment, the computation closures within environments 813a, 813b and the computation closures store 817 may be composed based on anonymous function objects and automatically created by a compiling system using methods for generating anonymous function objects such as lambda expressions.

FIG. 8B is an expanded view of a computation closure environment 813 as introduced in FIG. 8A. The computation closure environment 813 may be composed of one or more computation closure generating components. In one embodiment the computation closure environment 813 has a services infrastructure 823 that provides various services for the user of the UE 107. The services may include any application that can be performed on the UE 107 such as, games, music, text messaging, voice calls, etc. In one embodiment, the service infrastructure 823 provides support for closure migration under the supervision of a distributed computation manager 103 as discussed in FIG. 1 and FIG. 2. The agent Agent1 retrieves the computation closures required by the services infrastructure 823 from the computation closures store 849 and stores the newly generated computation closures by the services infrastructure 823 into the computation closures store 849 for migration purposes per arrow 841.

In another embodiment, the computation closure environment 813 has a developer experience module 827 that provides various tools for a developer for manipulating services offered by the UE 107. The tools may include standardized and/or abstract data types and services allowing the developers to chain processes together across development platforms. In one embodiment, the developer experience module 827 provides cross platform support for abstract data types and services under the supervision of a distributed computation manager 103 as discussed in FIG. 1. The agent Agent2 retrieves the computation closures required by the developer experience module 827 from the computation closures store 849 and stores the newly generated computation closures by the developer experience module 827 into the computation closures store 849 for migration purposes per arrow 843.

In yet another embodiment, the computation closure environment 813 has a scalable computing module 831 that provides an abstract wrapper (i.e. monadic wrapper) for the migrating closures 601. This abstraction provides computation compatibility between the closures 601 and the UE 107. The abstract wrapper may provide scheduling, memory management, system calls and other services for various processes associated with the closures 601. These services are provided under the supervision of the distributed computation manager 103 as discussed in FIG. 1. The agent Agent3 retrieves the computation closures required by the scalable computing module 831 from the computation closures store 849 and stores the newly generated computation closures by the scalable computing module 831 into the computation closures store 849 for migration purposes per arrow 845. In one embodiment, the backend environment 117 may access the computation closure store 849 and exchange/migrate one or more computer closures 847 between the computation closures store 849 and the backend computation closures store 817.

Figure 9:
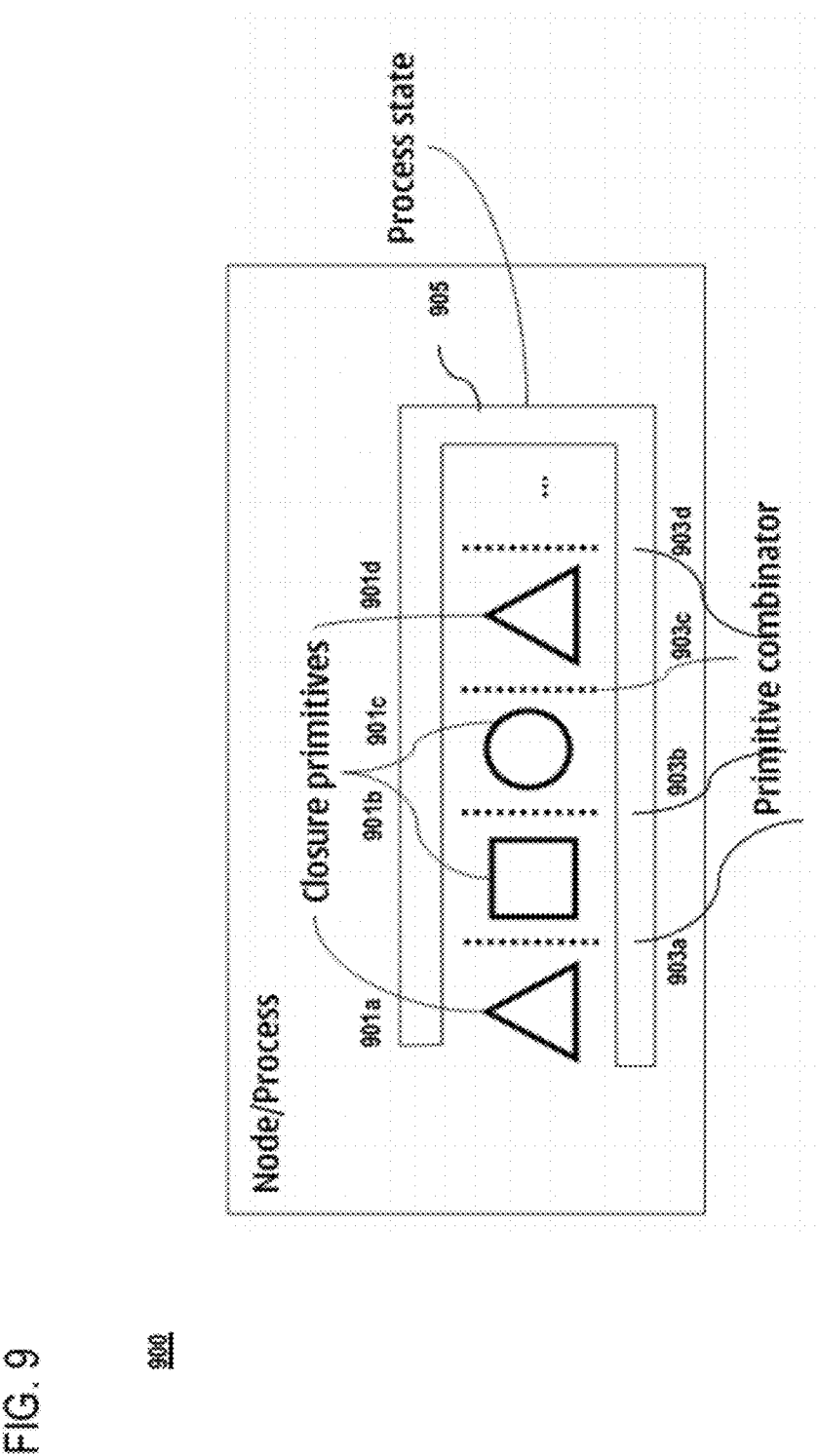
FIG. 9 is a diagram showing a process as a combination of primitive computation closures, according to one embodiment.

FIG. 9 is a diagram showing a process as a combination of primitive computation closures, according to one embodiment. Process 900 consists of closure primitives 901a-901d. The closure primitives 901a-901d, which are similar to closures 613a, 613b and 615 in FIG. 6, are combined with each other into process 900 by combinators 903a-903d. The object 905 represents the execution requirements including process states under which the execution of closures 901a-901d combined by combinators 903a-903d will result in the process 900.

In one embodiment, migration of process 900 by the migration module 205 of the distributed computation manager 103 includes migration of closures 901a-901d, combinators 903a-903d 9 and the process states 905 as independent elements into, for instance, an infrastructure environment 117. The independent closures 901a-901d from infrastructure environment 117 may be distributed into different components 119a-119m where they may be executed.

Figure 10:
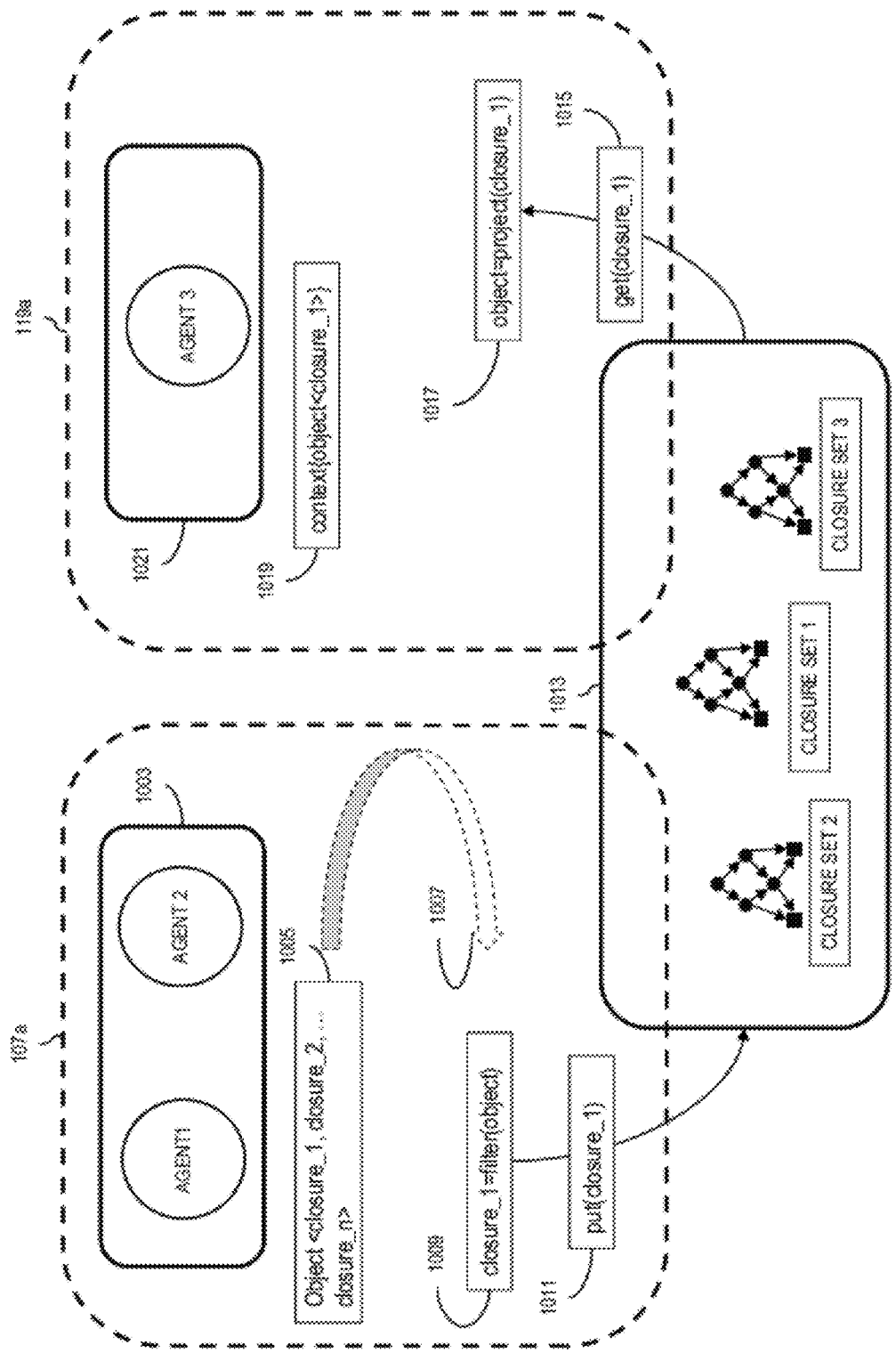
FIG. 10 is a diagram of process migration from a device to another device, according to one embodiment.

FIG. 10 is a diagram of process migration from a device to another device, according to one embodiment. In one embodiment, the device 107a is a UE associated with the user. The UE 107a may include a user context 1003 which is being migrated among devices. Agent1 and agent2 are processors that calculate and handle computation closures within the user context 1003. The number of agents may be different in different devices based on their design, functionality, processing power, etc. Block 1005 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 10, the filtering process 1007 extracts closure_1 from the closure set Object via filtering the set (shown in block 1009). The extracted closure_1 is added to a computation closure store 1013 using the exemplary Put command 1011.

It is assumed, in this example, that component 119a of an infrastructure level (not shown) is selected by the architectural level selector 203 of the distributed computation manager 103 as a destination for closure migration from UE 107a. The extracted computation closure, closure_1 is migrated to component 119a by the migration module 205 and executed on component 119a.

In one embodiment, the component 119a receives the computation closure closure_1 and extracts it from the computation closure store 813 using the Get command 1015. The extracted closure_1 is projected into a closure with the user device context (process states 905) and the object 1017 is produced. The block 1019 represents the reconstruction of the closure into the initial context by a component in charge of the execution. The aggregated context may then be executed in the run-time environment 1021 of component 119a by Agent3.

In another embodiment, the UE 107a and component 119a may exchange places and the migration is performed from the component 119a to UE 107a or both devices may be UEs. In this embodiment the decomposition and aggregation processes are similar to the above example.

Figure 11:
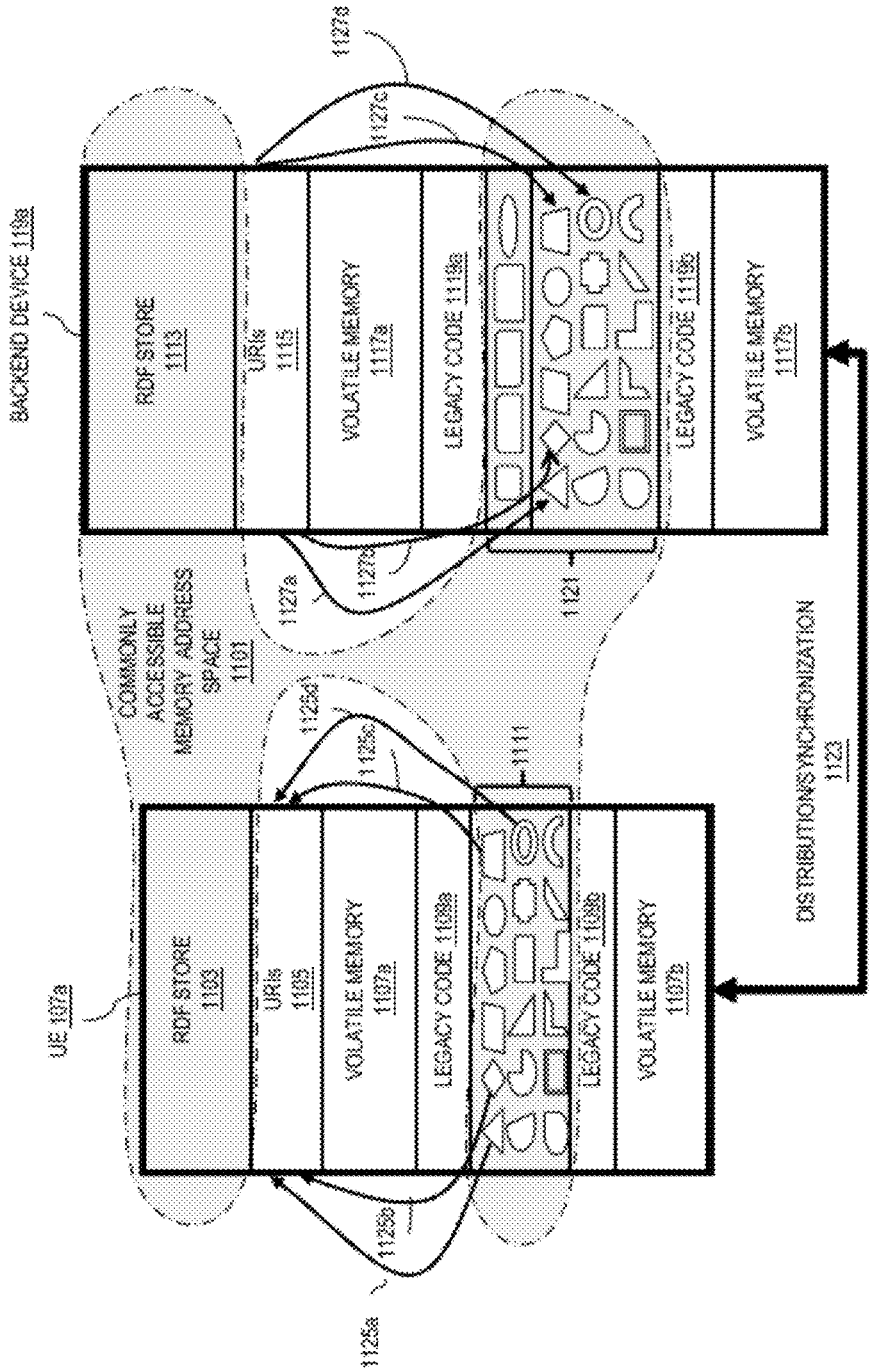
FIG. 11 is a diagram of computation closure allocation/mapping, according to one embodiment.

FIG. 11 is a diagram of computation closure allocation/mapping, according to one embodiment. The diagram of FIG. 11 shows a commonly accessible memory address space 1101 formed between a UE 107a as a client and the backend device 119a as a component of a computation infrastructure 117.

In one embodiment, the UE 107a may include RDF store 1103, which holds computation closures for processes associated with the UE 107a. Similarly the backend device 119a may includes a RDF store 1113, which holds computation closures associated with processes related to device 119a, UEs 107a-107i, or any other devices having connectivity to device 119a or cloud 111.

In other embodiments, the Uniform Resource Identifiers (URIs) 1105 in UE 107a and 1115 in backend device 119a may be used to identify names or resources accessible to their respective devices via the communication network 105. Furthermore, the legacy codes associated with each device may be stored in legacy code memory areas 1109a and 1109b on UE 107a and 1119a and 1119b on backend device 119a.

In one embodiment, UE 107*a* may be provided with a non-volatile memory space 1111 as a closure store. The closure store 1111 may include a set of closure primitives shown as geometric objects, similar to primitives of sets 601 or 603 of FIG. 6 or 910*a*-901*d* of FIG. 9. Similarly, the backend device 119*a* may be provided with a non-volatile memory space 1121 as a closure store. The closure store 1121 may also include a set of closure primitives shown as geometric objects. In one embodiment, the closure store 1111 is a subset of closure store 1121 determined, at least in part, based on one or more criteria such as time of access, frequency of access, a priority classification, etc. Since non-volatile memories are costly and require extensive resources (e.g. power consumption) compared with volatile memories (such as 1107*a*, 1107*b*, 1117*a*, and 1117*b*), the capacity of non-volatile memory on a UE 107*a*-107*i* is limited. However, a backend device 119*a*, serving high numbers of users, may be equipped with larger volumes of non-volatile memory spaces. Because of the limited capacity of non-volatile memory spaces on UEs 107*a*-107*i*, a subset of the closure store 1121 is stored locally at the closure store 1111 for local use by the UE 107*a*. In order to minimize the number of times a UE 107 needs to retrieve one or more primitives from closure store 1121 of device 119*a*, the subset 1111 is determined based on one or more criteria. In one embodiment, the closure store 1111 may be determined as a set of the most frequently accessed closure primitives of closure store 1121 by UE 107*a*. In another embodiment, the closure store 1111 may be determined as a set of the most recently accessed closure primitives of closure store 1121 by UE 107*a*. In other embodiments, various combined conditions and criteria may be used for determining subset 1111 from set 1121 as the content of closure store for UE 107*a*. Furthermore, the closure stores 1111 and 1121 may be periodically synchronized. The synchronization of closure stores ensures that any changes (addition, deletion, modification, etc.) in closure primitives of closure store 1121 are reflected in the closure store 1111.

In one embodiment, for execution of a closure set 601 (a subset of closure store 1111) associated with a process on UE 107*a*, the set 601 can be migrated by the migration module 205 of the distributed computation manager 103 to the backend device 119*a* which is a component of the infrastructure 117 (the migration path shown as arrow 1123). The distributed computation manager 103 may then inform the processing components of the UE 107*a*, the backend device 119*a* or a combination thereof (the processing components are not shown), that the closure primitives are ready for execution.

In one embodiment, any changes on the closure store 1121 of the backend device 119*a* (e.g., addition, deletion, modification, etc.) may first enter the URIs 1115 via the communication network 105. The changes may then be applied from URIs 1115 on closure store 1121 shown by arrows 1127*a*-1127*d*. Similarly, the closure store 1111 is updated based on the content of the closure store 1121 and the updates are shared with other components within UE 107*a* (e.g. with URIs 1105 as shown by arrows 1125*a*-1125*d*).

In one embodiment, as seen in FIG. 6, the commonly accessible memory address space 1101 is formed from the RDF stores 1103 and 1113 and the closure stores 1111 and 1121. The commonly accessible memory address space 1101 can be accessed as a continuous memory space by each of the devices 107*a* and 119*a*.

The processes described herein for providing multi-level distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
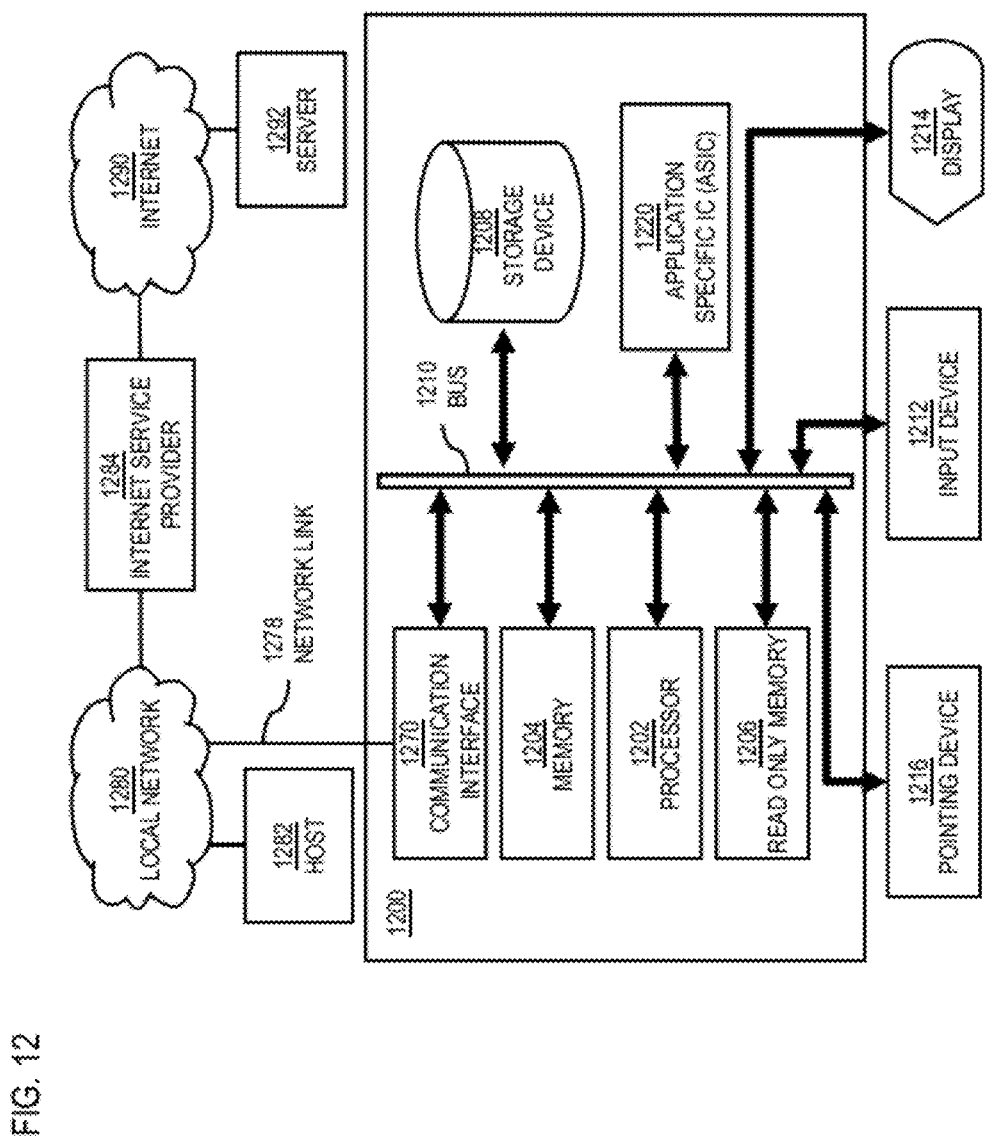
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to provide multi-level distributed computations as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of providing multi-level distributed computations.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to providing multi-level distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing multi-level distributed computations. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing multi-level distributed computations, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for providing multi-level distributed computations to the UE 107.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to provide multi-level distributed computations as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of providing multi-level distributed computations.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide multi-level distributed computations. The memory 1305 also stores the data associated with or generated by the execution of the inventive steps.

Figure 14:
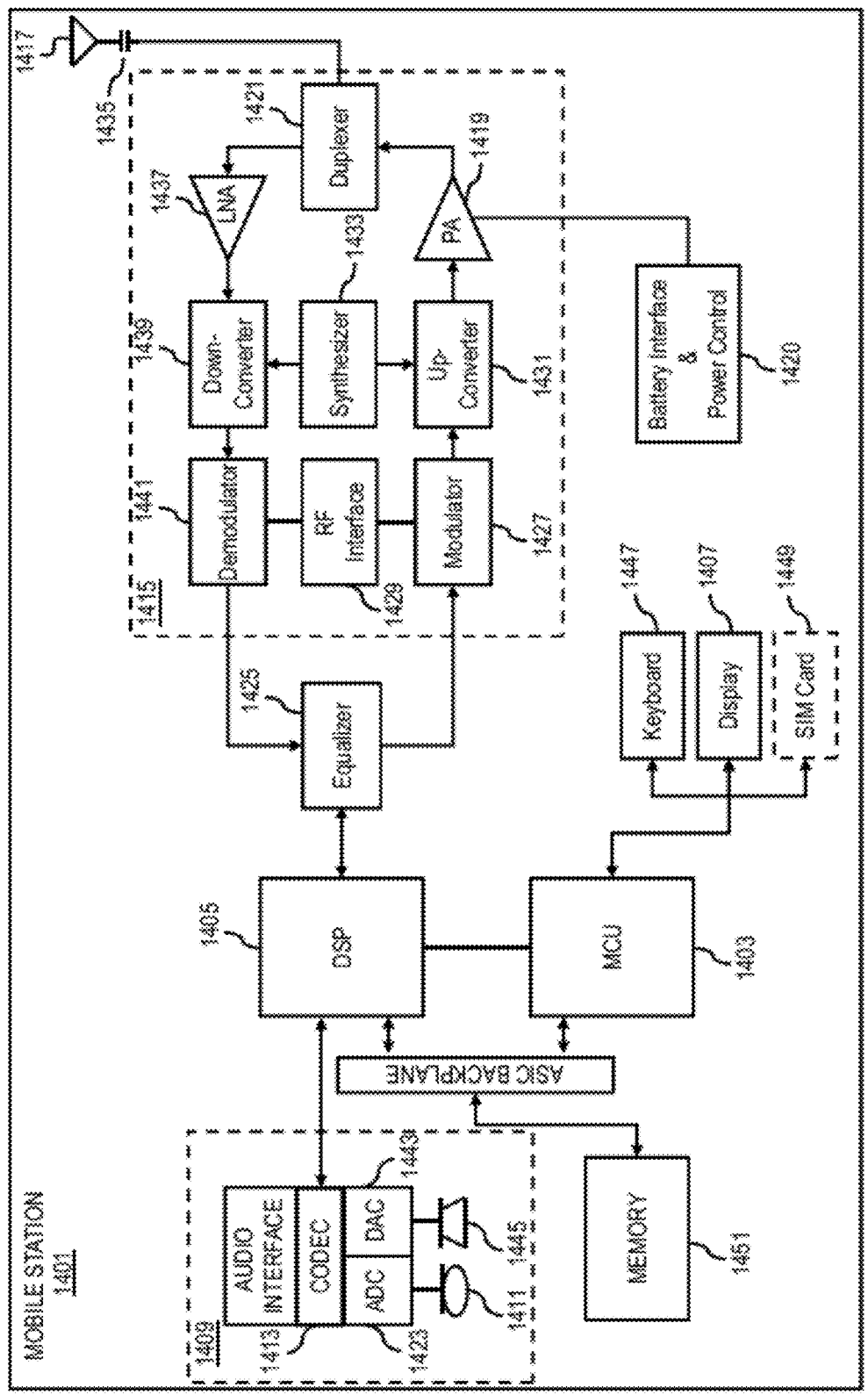
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of providing multi-level distributed computations. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of providing multi-level distributed computations. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to provide multi-level distributed computations. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving at least one request to migrate at least one computation closure within a computational architecture, the computational architecture comprising a plurality of architectural levels including a device level, an infrastructure level, and a cloud computing level;
   determining support capability of the respective levels of the computational architecture, wherein the determination is performed hierarchically for the respective architectural levels starting with a lowest level and terminating when support capability is determined for the at least one computational closure such that the hierarchical determination commences with the device level and proceeds upward therefrom until the support capability is determined;
   causing at least one selection of at least one of the architectural levels from among the device level, the infrastructure level, the cloud computing level or layers thereof based, at least in part, on the determination of the support capability of the respective levels of the computation architecture; and
   causing at least one migration of at least a portion of the at least one computation closure to the selected at least one of the architectural levels.

2. A method of claim 1, further comprising:
   determining to map, to verify, and/or to validate one or more elements, one or more functions, or a combination thereof associated with the at least one computation closure against one or more other elements, one or more other functions, or a combination thereof of one or more other computation closures associated with any one or more of the architectural levels.

3. A method of claim 1, further comprising:
   determining one or more predetermined configurations for distributing the at least one computation closure,
   wherein the at least one selection of the at least one of the architectural levels is based, at least in part, on the one or more predetermined configurations.

4. A method of claim 1, further comprising:
   determining an alignment of the at least one computation closures among one or more of the architectural levels,
   wherein the at least one selection of the at least one of the architectural levels is based, at least in part, on the alignment.

5. A method of claim 1, further comprising:
   determining resource availability information associated with the selected at least one of architectural levels; and
   determining at least one recommendation, at least one instruction, or a combination thereof for increasing resource availability at the selected at least one of the architectural levels.

6. A method of claim 1, further comprising:
   determining one or more changes at the selected at least one of the architectural levels; and
   determining to reject, to delay, to withdraw, and/or to redistribute the migration of the at least one computation closure based, at least in part, on the one or more changes.

7. A method of claim 1, wherein one or more nodes of the infrastructure level include, at least in part, a set of computation closures used by one or more devices at the device level that have connectivity to the network infrastructure level via the one or more nodes.

8. A method of claim 7, wherein the one or more nodes include, at least in part, one or more backbones, one or more base stations, one or more routers, or a combination thereof.

9. A method of claim 1, wherein the device level includes one or more devices, the infrastructure level includes one or more infrastructures, and the cloud computing level includes one or more backend services.

10. A method of claim 1, wherein the selected at least one of the architectural levels is announced within the computational architecture.

11. A method of claim 1, wherein the at least one migration is from the device level to the infrastructure level.

12. A method of claim 1, wherein the at least one migration is from the cloud computing level to the infrastructure level.

13. An apparatus comprising:
    at least one processor; and
    at least one memory including computer program code for one or more programs, the at least one memory and the computer program code configured to, with the at least one processor, cause the apparatus to:
    receive at least one request to migrate at least one computation closure within a computational architecture, the computational architecture comprising a plurality of architectural levels including a device level, an infrastructure level, and a cloud computing level;
    determine support capability of the respective levels of the computational architecture, wherein the determination is performed hierarchically for the respective architectural levels starting with a lowest level and terminating when support capability is determined for the at least one computational closure such that the hierarchical determination commences with the device level and proceeds upward therefrom until the support capability is determined;
    cause at least one selection of at least one of the architectural levels from among the device level, the infrastructure level, the cloud computing level or layers thereof based, at least in part, on the determination of support capability of the respective levels; and
    cause at least one migration of at least a portion of the at least one computation closure to the selected at least one of the architectural levels.

14. An apparatus of claim 13, wherein the apparatus is further caused to:
    cause at least one mapping, at least one verification, and/or at least one validation of one or more elements, one or more functions, or a combination thereof associated with the at least one computation closure against one or more other elements, one or more other functions, or a combination thereof of one or more other computation closures associated with any one or more of the architectural levels.

15. An apparatus of claim 13, wherein the apparatus is further caused to:
    determine one or more predetermined configurations for distributing the at least one computation closure, wherein the determining to select the at least one of the architectural levels is based, at least in part, on the one or more predetermined configurations.

16. An apparatus of claim 13, wherein the apparatus is further caused to:
  determine an alignment of the at least one computation closures among one or more of the architectural levels,
  wherein the determining to select the at least one of the architectural levels is based, at least in part, on the alignment.

17. An apparatus of claim 13, wherein the apparatus is further caused to:
  determine resource availability information associated with the selected at least one of architectural levels; and
  determine at least one recommendation, at least one instruction, or a combination thereof for increasing resource availability at the selected at least one of the architectural levels.

18. An apparatus of claim 13, wherein the apparatus is further caused to:
  determine one or more changes at the selected at least one of the architectural levels; and
  determine to reject, to delay, to withdraw, and/or to redistribute the migration of the at least one computation closure based, at least in part, on the one or more changes.

19. An apparatus of claim 13, wherein one or more nodes of the infrastructure level include, at least in part, a set of computation closures used by one or more devices at the device level that have connectivity to the network infrastructure level via the one or more nodes.

20. An apparatus of claim 19, wherein the one or more nodes include, at least in part, one or more backbones, one or more base stations, one or more routers, or a combination thereof.

21. An apparatus of claim 13, wherein the device level includes one or more devices, the infrastructure level includes one or more infrastructures, and the cloud computing level includes one or more backend services.

22. An apparatus of claim 13, wherein the selected at least one of the architectural levels is announced within the computational architecture.

* * * * *